United States Patent
Bergenwall et al.

(10) Patent No.: US 6,567,664 B1
(45) Date of Patent: May 20, 2003

(54) REGISTRATION FOR MOBILE NODES IN WIRELESS INTERNET PROTOCOLS

(75) Inventors: Martin Bergenwall, Espoo (FI); Jan-Erik Ekberg, Hiki (FI); Patrik Flykt, Helsinki (FI); Henry Haverinen, Tampere (FI); Jani Månsson, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/323,840

(22) Filed: Jun. 2, 1999

(51) Int. Cl.[7] ................................................. H04Q 7/20
(52) U.S. Cl. ...................... 455/435; 455/432; 455/403; 455/433
(58) Field of Search .......................... 455/432, 433, 455/435, 403, 428, 422, 445; 370/912, 913, 400, 401

(56) References Cited

U.S. PATENT DOCUMENTS

| | | | |
|---|---|---|---|
| 5,598,459 A | * 1/1997 | Haartsen | 379/58 |
| 5,819,178 A | * 10/1998 | Cropper | 455/433 |
| 5,862,482 A | 1/1999 | Beesley | |
| 6,230,012 B1 | * 5/2001 | Willkie et al. | 455/435 |
| 6,370,147 B1 | * 4/2002 | Beser | 370/401 |

OTHER PUBLICATIONS

Y. Li et al., "Protocol Architecture For Universal Personal Computing", IEEE Journal on Selected Areas in Communications, US, IEEE, Inc., vol. 15, No. 8, pp. 1467–1476, Oct. 1997.

C. Perkins, "Mobile IP", IEEE Communications Magazine, US, IEEE Service Center, vol. 35, No. 5, pp. 84–86 and 91–99, May 1997.

* cited by examiner

*Primary Examiner*—Daniel Hunter
*Assistant Examiner*—Lana Le
(74) *Attorney, Agent, or Firm*—Antonelli, Terry, Stout & Kraus, LLP (57) ABSTRACT

A re-registration authorization is attached to a registration request or data packet sent from a mobile node roaming on a foreign network. The mobile node requests registration with its home network in order to maintain communication with the Internet and maintain identification of the mobile node by its individual home address. Such registration has a limited lifetime, and the re-registration authorization attached to the registration request or other data packet authorizes an intermediate communication entity in the foreign network to re-register the mobile node, on behalf of the mobile node, with the mobile node's home network, if the communication traffic of the mobile node indicates that the mobile node is still roaming on the foreign network. The rate of error is reduced by significantly reducing the amount of transmissions sent from the mobile node, and power consumption of the typically battery-powered mobile unit is reduced, as well.

60 Claims, 4 Drawing Sheets

| Type | S | B | D | M | G | V | rsv | Lifetime |
|------|---|---|---|---|---|---|-----|----------|
| Home Address ||||||||||
| Home Agent ||||||||||
| Care-of Address ||||||||||
| ||||||||||
| Registration Authorization Extension ||||||||||

FIG. 1
(PRIOR ART)
IPv4 MOBILE IP

| Type | S | B | D | M | G | V | rsv | Lifetime |
|------|---|---|---|---|---|---|-----|----------|

| Home Address |
|---|

| Home Agent |
|---|

| Care-of Address |
|---|

| Extensions |
|---|

FIG. 4
(PRIOR ART)

| Type | Length | Data ... |
|------|--------|----------|

FIG. 5

| Type | S | B | D | M | G | V | rsv | Lifetime |
|------|---|---|---|---|---|---|-----|----------|
| Home Address ||||||||||
| Home Agent ||||||||||
| Care-of Address ||||||||||
|  ||||||||||
| Registration Authorization Extension ||||||||||

FIG. 6

| Type | Length | Data ... |
|------|--------|----------|

REGISTRATION FOR MOBILE NODES IN WIRELESS INTERNET PROTOCOLS

BACKGROUND OF THE INVENTION

The present invention relates to methods for registering and re-registering mobile nodes with their home network while roaming in a foreign network.

A mobile node is a terminal which is able to change its point of connection to a packet data network, which includes, but is not limited to, the Internet, from one network or sub-network to another. For the sake of the present discussion, all references to the Internet which follow in this specification will be presumed to include all other packet data networks.

Mobile Internet Protocol (Mobile IP) allows mobile nodes to roam from network to network or move from place to place within a network while maintaining communication with the Internet and maintaining identification of the mobile node by its individual home address, regardless of the mobile node's current connection to the Internet. Mobile IP is described in the work-in-progress by Perkins et al. in "IP Mobility Support", IETF Mobile IP Working Group, RFC 2002, 1996, and is herein incorporated by reference.

Figure 1:
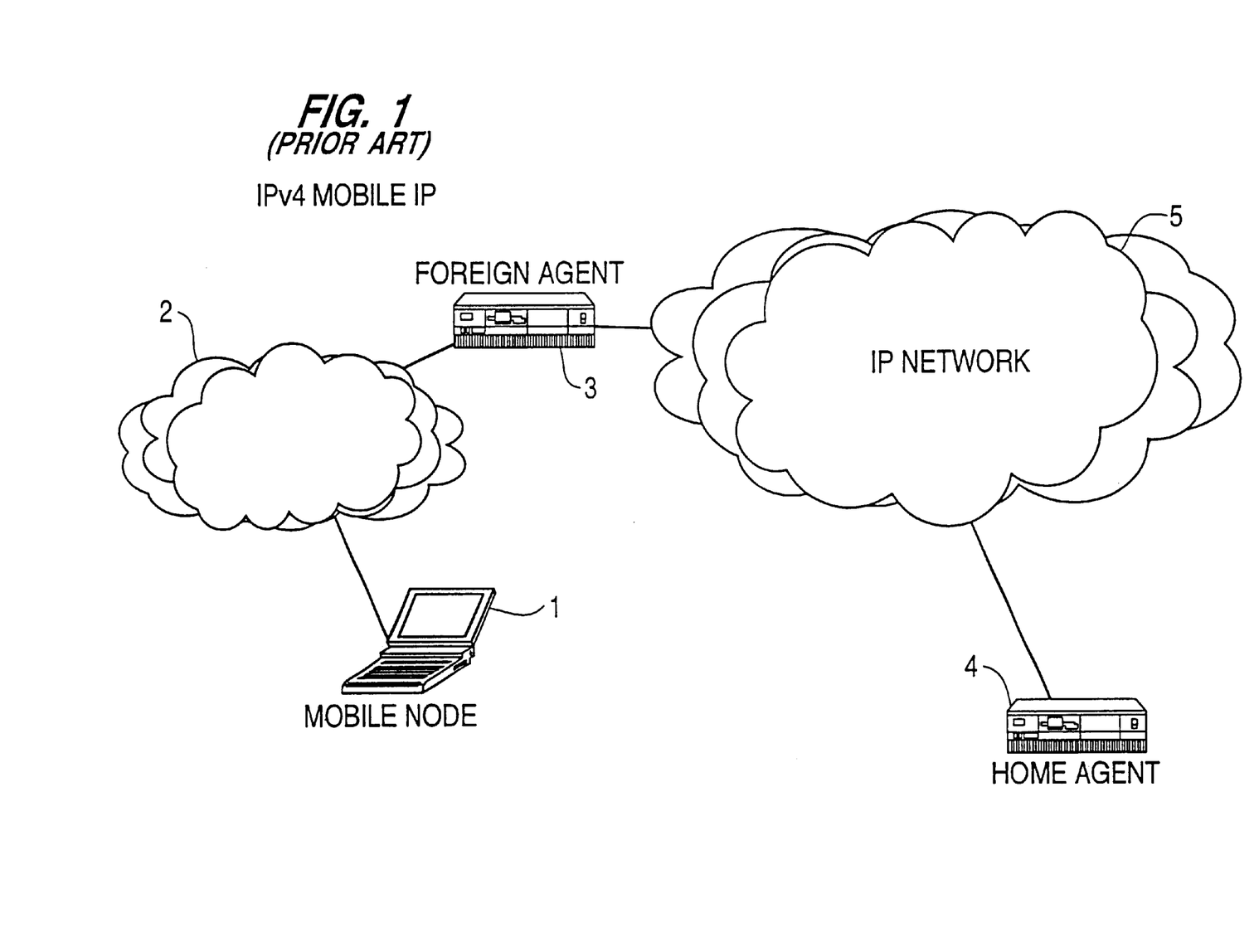
FIG. 1 illustrates a prior art network architecture in which a mobile node is roaming on a foreign network, wherein the mobile node's home network is a known IPv4 network.

Using the known IPv4 protocol shown in FIG. 1, when a mobile node 1 has determined that it has roamed into a foreign network, that is, any network that is not the home network of the mobile node, the mobile node must register itself on the foreign network in order to establish and maintain a connection to the Internet via the home network of the mobile node. Such registration is limited in duration and registration may be performed repeatedly. In other words, registration enables the mobile node which is roaming on a foreign network to receive all data packets addressed to the mobile node's individual Internet home address on its respective home network. Accordingly, the mobile node can always be reached at its home address, regardless of the foreign network that it is located in. Furthermore, the mobile node must re-register itself in the foreign network if the duration of the mobile node's stay in the foreign network exceeds the duration of the validity of the original registration.

In FIG. 1, first a foreign agent 3, which is a router on the foreign network, periodically sends out messages indicating its availability for service on behalf of mobile nodes roaming thereon. These "agent advertisements" enable the mobile node to first determine if it is on its home network or on a foreign network. The "agent advertisements" further provide the mobile node with a "care of" address, which is a temporary address reflecting a roaming mobile node's current point of connection to the Internet, at which the mobile node can be reached if it is on a foreign network.

If the mobile node determines that it is roaming in a foreign network, based on information provided in the agent advertisement, the mobile node 1 sends a registration request, which includes the "care of" address, to the available foreign agent 3 which then forwards the registration request to the home agent 4 of the home network 5 of the mobile node. The home agent 4 sends a registration reply to the foreign agent 3 acknowledging the registration. By having the mobile node 1 register its current location in a foreign network with its home agent, the home agent 4 is able to create or modify a mobility binding (i.e., the association of the home address of the mobile node to the care-of address thereof) and therefore the mobile node 1 can receive data packets addressed to its individual home address which are forwarded by the home agent thereof. In IPv4, the registration request from the mobile node 1 and the registration reply from the home agent 4 are sent via User Datagram Protocol (UDP).

As a result of the mobile node's registration, the home agent 4, which is a router on the mobile node's home network 5, encapsulates data packets addressed to the mobile node's home network address in an IP tunnel directed to the care-of address provided by the mobile node. The foreign agent 3 receives the encapsulated IP packets, and forwards them to the mobile node 1. Furthermore, it should be noted that the mobile node 1 uses its individual home address as the source address of all IP data packets that it sends, even when on the foreign network.

Figure 2:
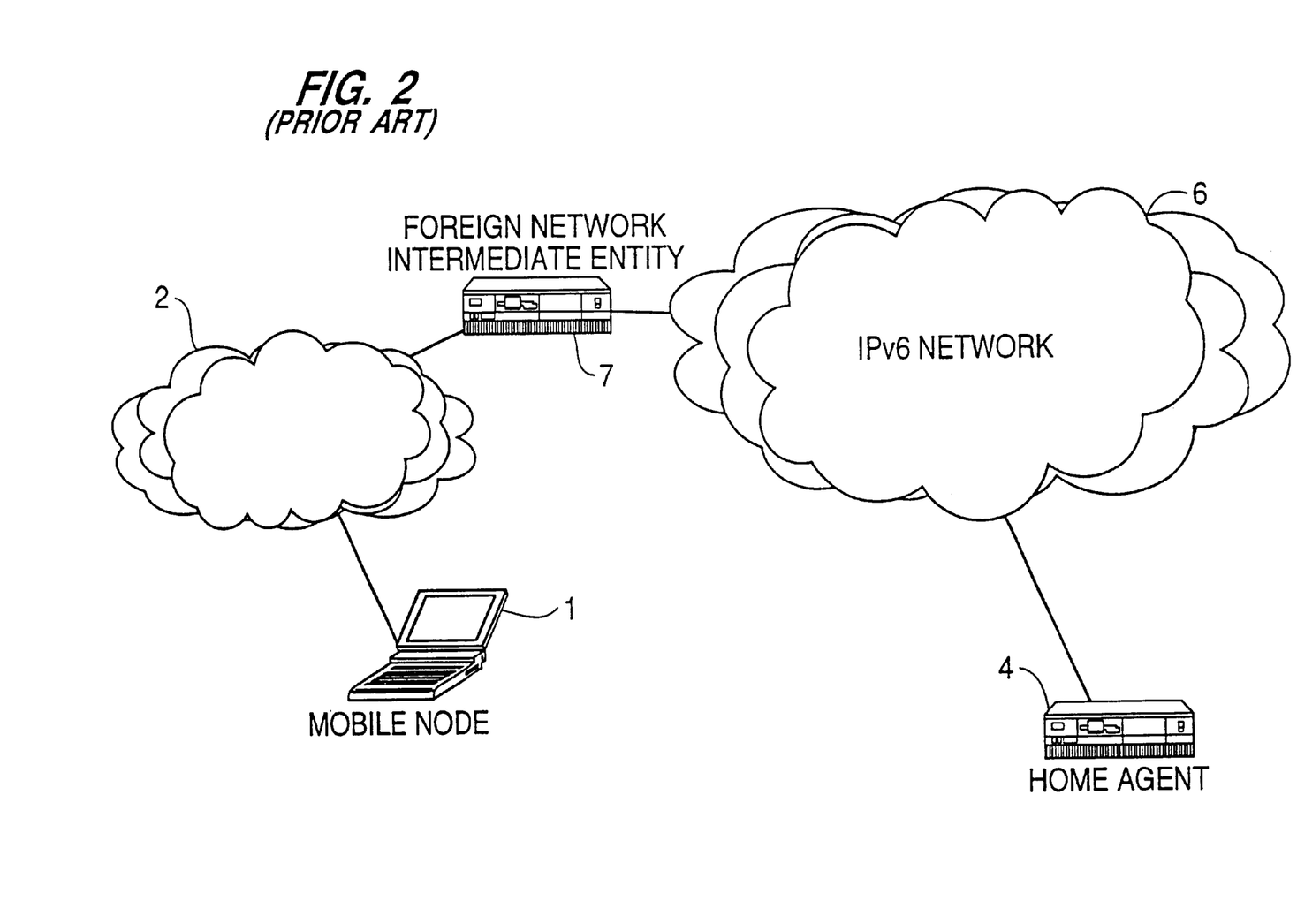
FIG. 2 illustrates a prior art network architecture in which a mobile node is roaming on a foreign network, wherein the mobile node's home network is an IPv6 network.

Mobile IP version IPv6, shown in FIG. 2, does not utilize a foreign agent to acquire "care-of addresses" for the mobile nodes 1, unlike the case for IPv4. Rather, IPv6 has built-in mobility support and utilizes "co-located care-of addresses," whereby the mobile nodes acquire the co-located care-of addresses themselves. Such methods for acquiring the co-located care-of addresses for IPv6 are described in the work-in-progress by Johnson et al. entitled "Mobility Support in IPv6" IETF Mobile IP Working Group, 1998, which also is incorporated herein by reference.

According to the IPv6 Mobile IP, a roaming mobile node 1 registers one of its co-located care-of addresses with a router on its home network 6, requesting the router to function as the home agent 4 for the mobile node. This is accomplished when mobile node 1 performs "binding" registration which is the association of the mobile node's home address with its co-located care-of address by sending a data packet including a "binding update" destination option to the home agent 4, to thereby make known the mobile node's primary care-of address to the home network. Acknowledgment of the binding update data packet is then forwarded from the home agent 4 to the mobile node 1. The binding update data packet and acknowledgment thereof between the mobile node 1 and the home agent 4 is transmitted using Internet Control Message Protocol (ICMP). The home agent then uses proxy neighbor discovery to intercept IPv6 data packets addressed to the mobile node's home address on the home link and tunnels any intercepted packet to the mobile node's primary care-of address. The aforementioned proxy neighbor discovery is described in the Johnson reference.

Figure 3:
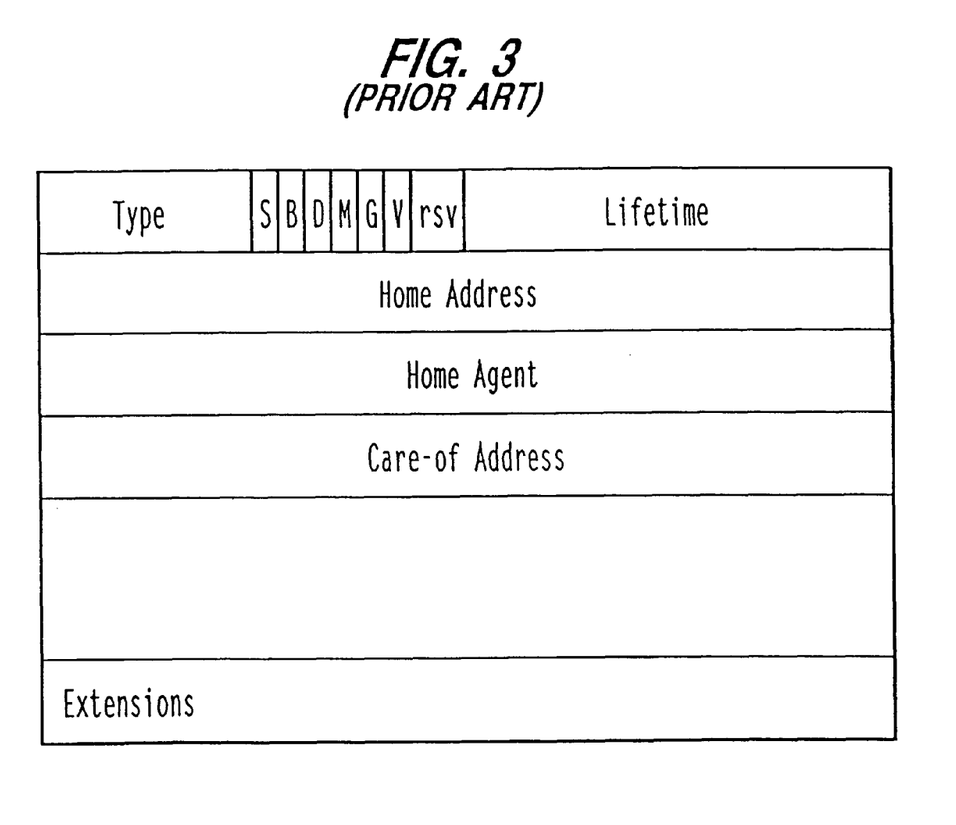
FIG. 3 shows a prior art User Data Protocol (UDP) registration request.
Figure 4:
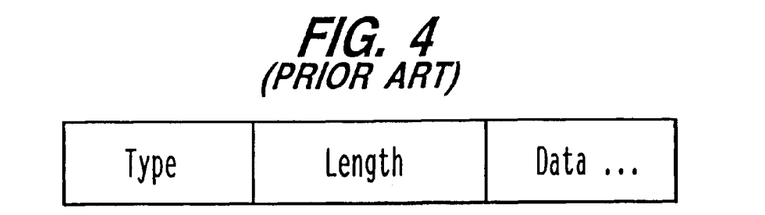
FIG. 4 shows a prior art extension to the registration request of FIG. 3.

A known format of the Mobile IP Registration Request sent from the mobile node to the foreign agent or to the home agent, as described above, is depicted in FIG. 3. As described in RFC 2002, the Mobile IP fields Registration Request include the following fields, which are common for both IPv4 and IPv6 Mobile IP, except where noted:

Type: identification as a Registration Request;

S:
  Simultaneous bindings. The mobile node is requesting that the home agent retain its prior mobility bindings;

B:
  Broadcast datagrams. The mobile node is requesting that the home agent tunnel any broadcast data packets addressed to the mobile node's home network address to the mobile node at its care-of address;

D:
  Decapsulation by the mobile node. The mobile node is indicating that it will decapsulate data packets that are sent to the care-of address itself, that is the mobile node is using a co-located care-of address (for IPv6);

M:
  Minimal encapsulation. The mobile node is requesting that its home agent use minimal encapsulation for data packets tunneled to the mobile node;
G:
  Encapsulation. The mobile node is requesting that its home agent use a specified standard of encapsulation for data packets tunneled to the mobile node;
V:
  The mobile node is requesting that either the home agent or foreign agent use Van Jacobson header compression over the corresponding link with the mobile node;
rsv:
  Reserved bits;
Lifetime:
  The amount of time (in seconds) remaining for valid registration of the mobile node;
Home Address:
  The IP address of the mobile node;
Home Agent:
  The IP address of the mobile node's home agent;
Care-of Address:
  The IP address for tunneling of data packets;
Identification:
  A 64-bit number used for matching Registration Requests with Registration Replies, composed by the mobile node; and
Extension(s): The fixed portion of the Registration Request can be followed by one or more extensions. The extension mechanism allows optional information to be carried by Mobile IP control messages or by ICMP Router Discover messages. Extensions are encoded in a Type-Length-Value format, as shown in FIG. 4. The format of the Extensions includes the following fields:
Type:
  Indicates the particular type of Extension;
Length:
  Indicates the length (in bytes) of the data field within the extension. The length does not include the Type and Length bytes; and
Data:
  The particular data associated with the extension.

Extensions allow variable amounts of information to be carried within each data packet. RFC 2002 defines two types of extensions. The first type of extension for Mobile IP can only appear in Mobile IP control messages, that is, to and from a UDP port. These extensions are Mobile-Home Authentication Extensions, Mobile-Foreign Authentication Extensions and Foreign-Home Authentication Extensions. Mobile-Home Authentication Extensions are utilized to authenticate registration requests. For example, when a mobile node includes a Mobile-Home Authentication Extension in the registration requests sent therefrom, the home agent is thus able to verify the integrity of the request. The second type of extensions can appear only in ICMP Router Discovery messages and are One-byte Padding Extensions, Mobility Agent Advertisement Extensions and Prefix-Length Extensions.

As mentioned briefly above, the lifetime or duration of such registration of a mobile node roaming on a foreign network is limited, and therefore the mobile node must re-register on the foreign node if it wishes to maintain its connection to the Internet and receive forwarded communications from its home agent at its care-of address.

Such re-registration repeats the same procedures discussed above. Therefore, consideration of re-registration of a mobile node on a foreign network must take into account the fact that the mobile node's connection to the Internet is usually a low bandwidth wireless link 2 (in both FIGS. 1 and 2) which is susceptible to a rate of error which is higher than that for a wired network. Such low bandwidth links include, but are not limited to, GSM/PSTN, CDMA or TDMA communication protocols. Furthermore, mobile nodes are very often battery-powered, and therefore repeated registrations in the foreign network would exhaust the power supply thereof. Therefore, it would be prudent to reduce the number of transmissions from the mobile node on such a low bandwidth link in order to reduce the rate of transmission error and also to reduce energy consumption by the mobile node. However, the presently known registration systems for Mobile IP described above, including IPv4 and IPv6, have not contemplated any steps or means for compensating for the deficiencies associated with repeated registrations of the mobile nodes in the foreign networks in which they respectively roam in order to maintain a connection with the Internet via the home network of the mobile node.

SUMMARY OF THE INVENTION

Therefore, the present invention is an improvement of Mobile IP which reduces traffic on the low bandwidth link between a mobile node and the foreign agent for IPv4 and the mobile node and the home agent for IPv6, and reduces power consumption by the mobile node by significantly reducing the number of transmissions by the mobile node for both IPv4 and IPv6 Mobile IP, thus overcoming the deficiencies of the prior art described above.

In particular, the present invention provides an extension attached to the Registration Request sent from the mobile node to the foreign agent, for IPv4, or the home agent, for IPv6, which provides authorization for the foreign agent or some other intermediate communication entity in the foreign network on which the mobile node is roaming to re-register the mobile node with the home agent of the mobile node's home network. Such an extension providing authorization for the foreign agent or some other intermediate communication entity in the foreign network to re-register the mobile node with the home agent of the mobile node's home network can also be attached any other data packet transmitted from the mobile node, including an authentication data packet.

That is, by utilizing the extension mechanism defined for Mobile IP, which allows optional information to be carried by Mobile IP control messages for IPv4 or by ICMP messages for IPv6, the present invention provides authorization for a router, dial-up server or other communication entity in a foreign network on which a mobile node is roaming to register and re-register the mobile with the mobile node's home network, so that all IP data packets forwarded to the individual home address of the mobile node are forwarded thereto, regardless of the location of its connection to the Internet.

When a mobile node has left its home network and received an agent advertisement from the foreign network on which it is presently roaming to thereby confirm its roaming status, the mobile node sends out a registration request to the foreign agent in the foreign network in order to establish a connection to the Internet, in the case of IPv4 Mobile IP, or sends a binding update data packet to an intermediate communication entity in the foreign network. Utilizing the home address information of the mobile node that is included in the registration request, the foreign agent forwards the mobile node's registration request to the home network of the mobile node in the case of IPv4 Mobile IP, or the intermediate communication entity of the foreign network forwards the binding update data packet in the case of IPv6 Mobile IP.

The home agent is, as an example, a router on the mobile node's home network. In the case of IPv4 Mobile IP, the home agent then forwards a registration reply to the foreign agent which, in turn, forwards the registration reply to the mobile node. In the case of IPv6 Mobile IP, the home agent sends a binding update acknowledgment through an intermediate communication entity in the foreign node. Assuming a positive reply from the home agent, for any of the protocols described above, the home agent is then able to tunnel Internet data packets addressed to the mobile node's individual home address to the mobile node on the foreign network, utilizing a care-of address which has been assigned to the mobile node.

In submitting the registration request to the foreign agent in the case of IPv4 Mobile IP, or in submitting the binding update data packet to the intermediate communication entity in the foreign network in the case of IPv6 Mobile IP, the mobile node attaches a re-registration authorization extension to the body of the registration request or binding update data packet. Thus, either the foreign agent or the intermediate communication entity in the foreign network will re-register the mobile node with the home agent of the mobile node's home network. The authorization for re-registration has an entitlement which exceeds the lifetime of the authorized registration of the mobile node in the foreign network. Thus, if the foreign agent or intermediate entity determines that the mobile node is still roaming on the foreign network based upon the detected communication traffic for the mobile node, the foreign agent or intermediate entity will re-register the mobile node's presence in the foreign network with the home agent thereof.

Alternatively, the registration request may be sent without an extension including the re-registration authorization. Instead, after the mobile node has been registered in the foreign network, the mobile node may transmit data packets to its home network, wherein the data packets include the extension having the re-registration authorization, in accordance with the extension described above.

Furthermore, the re-registration authorization does not have to be transmitted via an extension as described above. That is, a data packet transmitted from the mobile node after the mobile node has been registered in the foreign network may include re-registration authorization data without having an extension therefore.

Further still, the re-registration authorization may be included in the Mobile-Home Authentication extension which may be attached to the registration request so that the home agent is able to verify the integrity of the registration request. In this instance, the re-registration authorization extension is placed before the Mobile-Home Authentication extension so that the home agent is able to verify the integrity of the registration request and the re-registration authorization.

Accordingly, the need for repeated registration transmissions between the mobile node and the foreign agent or intermediate communication entity is significantly reduced, thereby reducing the likelihood of error in the low bandwidth transmission link there between, and consequently the number of transmissions sent forth from the mobile node are significantly reduced, as well, thereby reducing energy consumption by the mobile node, which is likely to be battery powered.

BRIEF DESCRIPTION OF THE DRAWINGS

The scope of the present invention will be apparent from the following detailed description, when taken in conjunction with the accompanying drawings, and such detailed description, while indicating preferred embodiments of the invention, are given as illustrations only, since various changes and modifications within the spirit and scope of the invention will become apparent to those skilled in the art from this detailed description, in which.

DETAILED DESCRIPTION OF A PREFERRED EMBODIMENT

Figure 5:
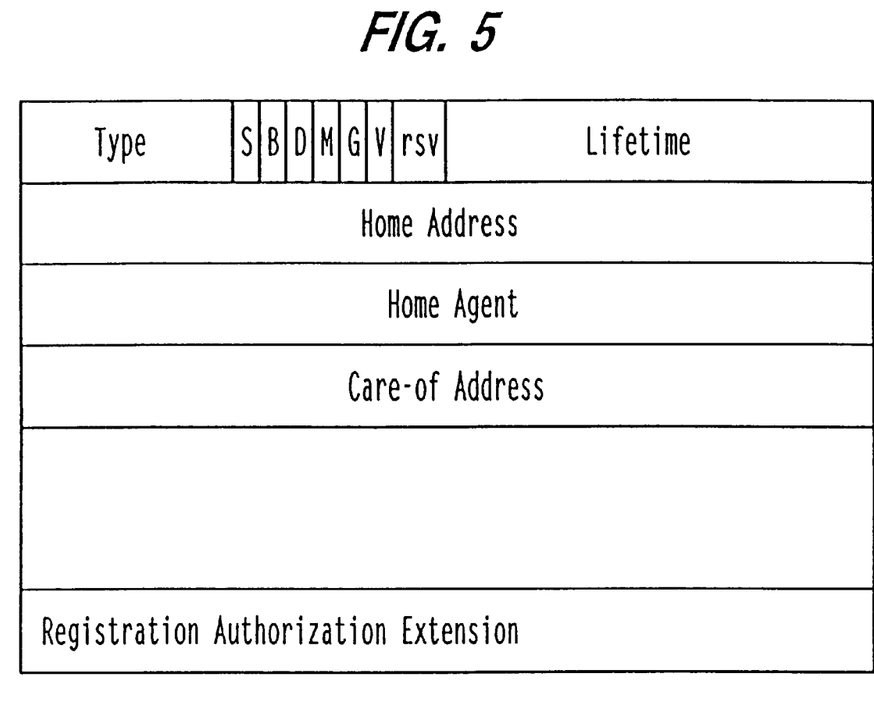
FIG. 5 shows a registration request according to the present invention, wherein the extension is a re-registration authorization extension.
Figure 6:
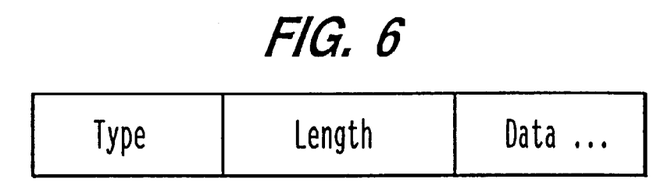
FIG. 6 shows the re-registration authorization extension of the present invention.

The present invention, as shown in FIG. 5, provides a registration request sent from a mobile node roaming on a foreign network, as described above. The registration request of FIG. 5 includes all of the fields described above in connection with the registration request of FIG. 3, except for the extension which will be described below. Therefore, description of the registration request will be presently omitted. Furthermore, the present invention enables the mobile node to roam from network to network or move from place to place within a network while maintaining communication with a packet data network, which includes, but is not limited to, the Internet. For the sake of the present discussion, all references to the Internet which follow in this specification will be presumed to include all other packet data networks.

The registration request of FIG. 5 includes a re-registration authorization extension which authorizes the foreign agent, in the case of IPv4 Mobile IP, or the intermediate communication entity, in the case of IPv6 Mobile IP, to re-register the mobile node with the home agent of the mobile node's home network when the lifetime of the previous registration has expired.

Thus, in the case of IPv4 Mobile IP, according to the present invention, the re-registration authorization extension attached to the registration request authorizes the foreign agent to re-register the mobile node on the foreign network after the lifetime of the previous registration thereof has expired. As described above in connection with the prior art, the valid lifetime registration for the mobile node on a foreign network is included in the registration request. Thus, after the mobile node has sent a registration request to the foreign agent, the foreign agent has forwarded the registration request to the home agent, and the home agent has sent an affirmative acknowledgment to the foreign agent which forwards the acknowledgment to the mobile node, the mobile node is then able to receive forwarded data packets addressed to its individual home address from the home agent through the connection established on the foreign network. When the lifetime of the registration of the mobile node is set to expire, the foreign agent checks the communication traffic to and from the mobile node. If the results of the check of the mobile node's communication traffic indicate that the mobile node is still roaming on the foreign network, the foreign agent re-registers the mobile node's presence on the foreign network with the home agent of the mobile node's home network on behalf of the mobile node.

Thus, the mobile node is not required to initiate the re-registration itself, thereby significantly reducing the number of transmissions between the mobile node and the foreign agent, which further reduces the rate of error particularly if the connection there between is a low bandwidth communication link.

It should be noted that either of the home network and foreign network can be a wireless network, and the entities for the foreign agent include, but are not limited to, a router. Most typically, the foreign network is the wireless network, and the mobile node is connected thereto utilizing a low bandwidth communication link which could include, but is not limited to, GSM/PSTN, CDMA or TDMA communication protocols. Such networks to which the present invention is applicable are the same as those depicted in the prior art figures described above, and therefore description thereof is presently omitted.

Furthermore, even the re-registration authorization included in the extension attached to the registration request sent from the mobile node to the foreign agent has a limited lifetime. Therefore, when the valid lifetime of the re-registration authorization is set to expire, if the mobile node wishes to remain registered on the foreign network, the mobile node must send a renewed registration request to the foreign agent. The re-establishment of the registration follows the original registration procedures described above. The renewed registration request may further include a renewed re-registration authorization extension for the same purposes and functions described above.

For IPv6 Mobile IP, registration of the mobile node on the foreign network is established as described above in connection with the prior art. As in the case of IPv4 Mobile IP described above, either of the home network and foreign network can be a wireless network. For IPv6 Mobile IP, since foreign agent are not required to assign a care-of address to the mobile node as in the case of IPv4 Mobile IP, the intermediate communication entity in the foreign network utilized for re-registering the mobile node on the foreign network may include, but is not limited to, a de-fault router of the foreign network or a dial-up server in the foreign network. Furthermore, it is likely that the foreign network is a wireless network, and the mobile node is connected thereto utilizing a low bandwidth communication link which could include, but is not limited to, GSM/PSTN, CDMA or TDMA communication protocols.

Based on the method and system described above for authorizing a communication entity in a foreign network to re-register a mobile node that is roaming on the foreign network with the mobile node's home network, the present invention is able to significantly reduce the rate of error in communication from the mobile node by reducing the number of transmissions therefrom. That is, reduced transmissions on the typically low bandwidth communication link established by the mobile node reduce the rate of error. Furthermore, by authorizing the intermediate entity in the foreign network to re-register the mobile node on the foreign network by utilizing a re-registration authorization extension attached to the registration request, thereby reducing the amount of transmissions sent from the mobile node, the active life of the typically battery-powered mobile node is significantly extended.

For both IPv4 and IPv6, another embodiment of the present invention attaches the re-registration authorization extension not to the registration request but rather to a data packet transmitted from the mobile node after registration of the mobile node in the foreign network. Such re-registration extension is attached to a data packet in accordance with the extension described above. Furthermore, such data packets transmitted from the mobile node after registration of the mobile node in the foreign network may include re-registration authorization data independent of an extension therefore. That is, re-registration authorization data, as described above, does not need to be transmitted via an extension to a registration request or a data packet. Rather, the re-registration authorization data may be included in a data packet itself.

Further still, the extensions the re-registration authorization data may be included in the Mobile-Home Authentication extension which may be attached to the registration request so that the home agent is able to verify the integrity of the registration request. In this instance, the re-registration authorization is placed before the Mobile-Home Authentication extension so that the home agent is able to verify the integrity of the registration request and the re-registration authorization.

While the present invention has been described in detail and pictorially in the accompanying drawings, it is not limited to such details since many changes and modifications may be made thereto without departing from the spirit and scope of the present invention. It is intended that all such modifications fall within the scope of the following claims.

We claim:

1. A method for a second network to register and re-register a mobile node for communication with a first network, said method comprising the steps of:
   sending from said mobile node a registration request to said second network, said registration request including an extension thereof;
   registering by said second network said mobile node for communication with said first network; and
   re-registering by said second network said mobile node for communication with said first network in accordance with said extension of said registration request.

2. A method according to claim 1, wherein said extension is a re-registration authorization extension.

3. A method according to claim 2, wherein said re-registration authorization extension is encoded in Type-Length-Value format.

4. A method according to claim 2, wherein said registration request is configured for IP Network Control Protocol (IPCP).

5. A method according to claim 2, wherein said registration request is configured for Link Control Protocol (LCP).

6. A method according to claim 2, wherein said re-registration authorization extension is valid for a limited duration.

7. A method according to claim 6, further comprising the step of:
   sending a renewed registration request which includes a new re-registration authorization extension from said mobile node to said second network when the limited duration of the validity of said re-registration authorization extension has expired.

8. A method according to claim 1, wherein said first network is a home network for said mobile node.

9. A method according to claim 1, wherein said second network is a foreign network in which said mobile node is roaming.

10. A method according to claim 1, wherein said registration request is received in a router of said second network.

11. A method according to claim 10, wherein said router of said second network is a default router.

12. A method according to claim 1, wherein said registration request is received in a dial-up server in said second network.

13. A method according to claim 1, wherein said second network registers said mobile node with a server in said first network.

14. A method according to claim 1, wherein said second network is a wireless network.

15. A method according to claim 1, wherein said second network registers said mobile node for communication with said first network after said first network has transmitted an affirmative registration reply to said second network.

16. A method according to claim 1, wherein said second network re-registers said mobile node for communication with said first network if said second network determines that said mobile node is active in said second network.

17. A method according to claim 1, wherein said extension is a Mobile-Home Authentication extension.

18. A method according to claim 17, wherein said Mobile-Home Authentication extension includes re-registration authorization data.

19. A system for maintaining a home network connection for a mobile node, comprising:
a first network;
a second network; and
a mobile node which has a home address in said first network,
wherein when said mobile node roams in said second network said mobile node sends a registration request including an extension of said registration request to said second network,
wherein said second network in response to said registration request registers said mobile node for communication with said first network, and re-registers said mobile node for communication with said first network in accordance with said extension of said registration request.

20. A system according to claim 19, wherein said extension is a re-registration authorization extension.

21. A system according to claim 20, wherein said re-registration authorization extension is valid for a limited duration.

22. A system according to claim 20, wherein said registration request is configured for IP Network Control Protocol (IPCP).

23. A system according to claim 20, wherein said registration request is configured for Link Control Protocol (LCP).

24. A system according to claim 19, wherein said registration request is received in a router of said second network.

25. A system according to claim 24, wherein said router of said second network is a default router.

26. A system according to claim 19, wherein said registration request is received in a dial-up server in said second network.

27. A system according to claim 19, wherein said second network registers said mobile node with a server in said first network.

28. A system according to claim 19, wherein said second network is a wireless network.

29. A system according to claim 19, wherein said second network registers said mobile node for communication with said first network after said first network has transmitted an affirmative registration reply to said second network.

30. A system according to claim 19, wherein said second network re-registers said mobile node for communication with said first network if said second network determines that said mobile node is active in said second network.

31. A system according to claim 19, wherein said extension is a Mobile-Home Authentication extension.

32. A system according to claim 31, wherein said Mobile-Home Authentication extension includes re-registration authorization data.

33. A method for a second network to register and re-register a mobile node for communication with a first network, said method comprising the steps of:
registering by said second network said mobile node for communication with said first network;
sending data from said mobile node to said first network, the data comprising a data packet including re-registration authorization data; and
re-registering by said second network said mobile node for communication with said first network in accordance with said data.

34. A method according to claim 33, wherein said data includes re-registration authorization data.

35. A method according to claim 34, wherein said re-registration authorization data is encoded in Type-Length-Value format.

36. A method according to claim 34, wherein said registration is configured for IP Network Control Protocol (IPCP).

37. A method according to claim 34, wherein said registration is configured for Link Control Protocol (LCP).

38. A method according to claim 34, wherein said re-registration authorization data is valid for a limited duration.

39. A method according to claim 38, further comprising the step of:
sending further data which includes new re-registration authorization data from said mobile node when the limited duration of the validity of said re-registration authorization data has expired.

40. A method according to claim 33, wherein said first network is a home network for said mobile node, and said mobile node has a home address on said first network.

41. A method according to claim 33, wherein said second network is a foreign network in which said mobile node is roaming.

42. A method according to claim 33, wherein said data is received in a router of said second network.

43. A method according to claim 42, wherein said router of said second network is a default router.

44. A method according to claim 33, wherein said data is received in a dial-up server in said second network.

45. A method according to claim 33, wherein said second network registers said mobile node with a server in said first network.

46. A method according to claim 33, wherein said second network is a wireless network.

47. A method according to claim 33, wherein said second network registers said mobile node for communication with said first network after said first network has transmitted an affirmative registration reply to said second network.

48. A method according to claim 33, wherein said second network re-registers said mobile node for communication with said first network if said second network determines that said mobile node is active in said second network.

49. A system for maintaining a home network connection for a mobile node, comprising:

a first network;

a second network; and a mobile node which has a home address in said first network, wherein when said second network registers said mobile node for communication with said first network in response to a request from said mobile node, said mobile node transmits data to said first network, the data comprising a data packet including re-registration authorization data, and wherein said second network re-registers said mobile node for communication with said first network in accordance with said data.

50. A system according to claim 49, wherein said data includes re-registration authorization data.

51. A system according to claim 50, wherein said re-registration authorization data is valid for a limited duration.

52. A system according to claim 50, wherein said registration is configured for IP Network Control Protocol (IPCP).

53. A system according to claim 50, wherein said registration is configured for Link Control Protocol (LCP).

54. A system according to claim 49, wherein said data is received in a router of said second network.

55. A system according to claim 54, wherein said router of said second network is a default router.

56. A system according to claim 49, wherein said data is received in a dial-up server in said second network.

57. A system according to claim 49, wherein said second network registers said mobile node with a server in said first network.

58. A system according to claim 49, wherein said second network is a wireless network.

59. A system according to claim 49, wherein said second network registers said mobile node for communication with said first network after said first network has transmitted an affirmative registration reply to said second network.

60. A system according to claim 49, wherein said second network re-registers said mobile node for communication with said first network if said second network determines that said mobile node is active in said second network.

* * * * *